United States Patent

[11] 3,616,884

[72] Inventor  Bälz, Jürge
             Heilbronn/Neckar, Germany
[21] Appl. No. 882,975
[22] Filed    Dec. 8, 1969
[45] Patented Nov. 2, 1971
[73] Assignee Firma Helmut Balz GmbH
             Heilbronn Neckar, Germany
[32] Priority Sept. 11, 1969
[33]          Germany
[31]          P 19 460 043.6

[54] POWER-DRIVEN POSITIONING SYSTEM WITH INTERRUPT MEANS UPON APPLICATION OF A PREDETERMINED POSITIONING FORCE AT END POINTS OF TRAVEL, PARTICULARY FOR VALVES AND THE LIKE
14 Claims, 11 Drawing Figs.

[52] U.S. Cl. .................................................. 192/141,
     192/142 R, 200/47, 251/134, 318/468
[51] Int. Cl. ........................................................ H01h 3/16,
                                                              F16k 31/04
[50] Field of Search .......................................... 192/141,
     142 R, 150; 251/134; 200/47; 318/468, 469;
                                                              74/424.8 VA

[56]           References Cited
               UNITED STATES PATENTS
2,407,537  9/1946   Chapman .....................  192/150 X
3,150,752  9/1964   Baumann .....................  251/134 X
3,524,526  8/1970   Denkowski....................  192/150 X
               FOREIGN PATENTS
1,547,154  10/1968  France ........................  251/134

Primary Examiner—Allan D. Herrmann
Attorney—Flynn & Frishauf

ABSTRACT: A rotatable positioning member driven, for example by a gear, from a motor, axially moves a threaded spindle. The positioning member is held between a pair of bowed disc springs, for limited axial excursion against the force of the disc springs. Wen an end position is reached, the positioning member will travel axially against one of the disc springs, thereby frictionally engaging a camming disc, concentric with the disc spring, the camming disc operating a projecting lever which moves a switch to cut power, so that terminal positions of the spindle (to which a valve stem can be connected) will be applied with force determined by bias on the spring discs.

POWER-DRIVEN POSITIONING SYSTEM WITH INTERRUPT MEANS UPON APPLICATION OF A PREDETERMINED POSITIONING FORCE AT END POINTS OF TRAVEL, PARTICULARY FOR VALVES AND THE LIKE

The present invention relates to a power-driven positioning system, in which power is interrupted when a limit, or end position is reached and a predetermined amount of force is transmitted at the end position, and more particularly to such a system which is compact, reliable, permits substantial positioning distance, while enabling presetting of the final force by means of springs.

Most positioning systems, as known in the art, have a part which is subject to travel, or excursion. When the end of the path is reached, a limit switch is operated to disconnect the drive motive power from the moving part. Usually, the operation of the limit switch depends on the linear motion of the travelling part. This causes some difficulty, particularly when the travelling part has to exert some power against a resistance, or is spring biased. If the travelling part operates against the strength of a spring, the springs must be made comparatively long in order to keep change in the force necessary to overcome spring stress to a minimum. In another solution, a plurality of disc, or bowed springs are necessary which are stacked in oppositely extending direction. Long coil springs, or long stacks of disc springs are frequently undesired since they increase the size and complexity of assemblies. It has also been proposed to use a lever arrangement so that the distance travelled by the movable part is proportionately reduced and represented by a smaller distance at a given point on a lever arm, and then operating the limit switch based on this smaller excursion. Yet, such arrangements also increase the complexity of assemblies and require an undue amount of space which is often not available in compact valve-operating assemblies. Many different arrangements presenting solutions to this problem are known —see for example German Patents 1,236,293 and 1,242,964 which, among others, also illustrate the problem to be solved.

It is an object of the present invention to provide a power-driven positioning system having a limit switch arrangement, in which the limit switch is operated upon application of force by the moving part, at its terminal position, which is simple in construction, compact, and in which the length of the path travelled by the movable part when applying force at a terminal position, is small.

SUBJECT MATTER OF THE PRESENT INVENTION

Briefly, a rotatable positioning member which, for example, may drive a valve stem, or the like, is held in centered position between a pair of bowed spring discs. The positioning member is driven by a motor, the threaded spindle, retained against rotation itself, travelling lengthwise of the axis of the rotatable positioning member. When the spindle, part of or attached to a valve stem, reaches its terminal position, the rotatable positioning member will, itself, move against the spring pressure of the bowed spring. In so doing, a camming disc located against the surface of the positioning member will be frictionally engaged to turn with the positioning member; an out-of-round portion will engage a lever which will be deflected to operate a shutoff switch for the drive motor, operating the rotatable member.

A pair of camming discs can be provided, engaging a pair of levers so that the arrangement will operate bidirectionally, that is disconnect the drive motor at both forward, and reverse limits of travel of the valve stem. The camming disc itself can be interposed between a frictional engagement disc, or a rim of the positioning member, to be pressed by the engagement disc, or rim, against the body of the positioning member upon excursion of the positioning member from a centered position between the bowed spring, when the terminal position of the member itself has been reached. The camming disc thus rotates with the positioning member, and the frictional coupling provides for positive engagement with a very short path of travel, only, of the rotatable member from its centered position between the disc springs. The limit switch is operated not by the linear excursion of the positioning member itself, but rather by the rotation thereof; as a result, the positioning member, and hence the camming disc (when frictionally engaged) can travel over a substantial distance without causing a corresponding linear motion of the valve stem, or spindle, and thus causing a corresponding substantial, and frequently undesired increase in power applied by the positioning member, by increase of the bias of spring elements. By suitable choice of the pitch of the thread on the spindle, the linear movement of the rotatable positioning member, or of the spindle, can be reduced to a minimum. The final power applied by the positioning element, for example to seat a valve cone on a valve seat will thus be substantially uniform, regardless of the amount of linear travel necessary, for example caused by wear on the valve cone. The absence of long counterbalancing springs enables construction of the system in a compact assembly.

The invention will be described by way of example with reference to the accompanying drawings, wherein.

Figure 1:
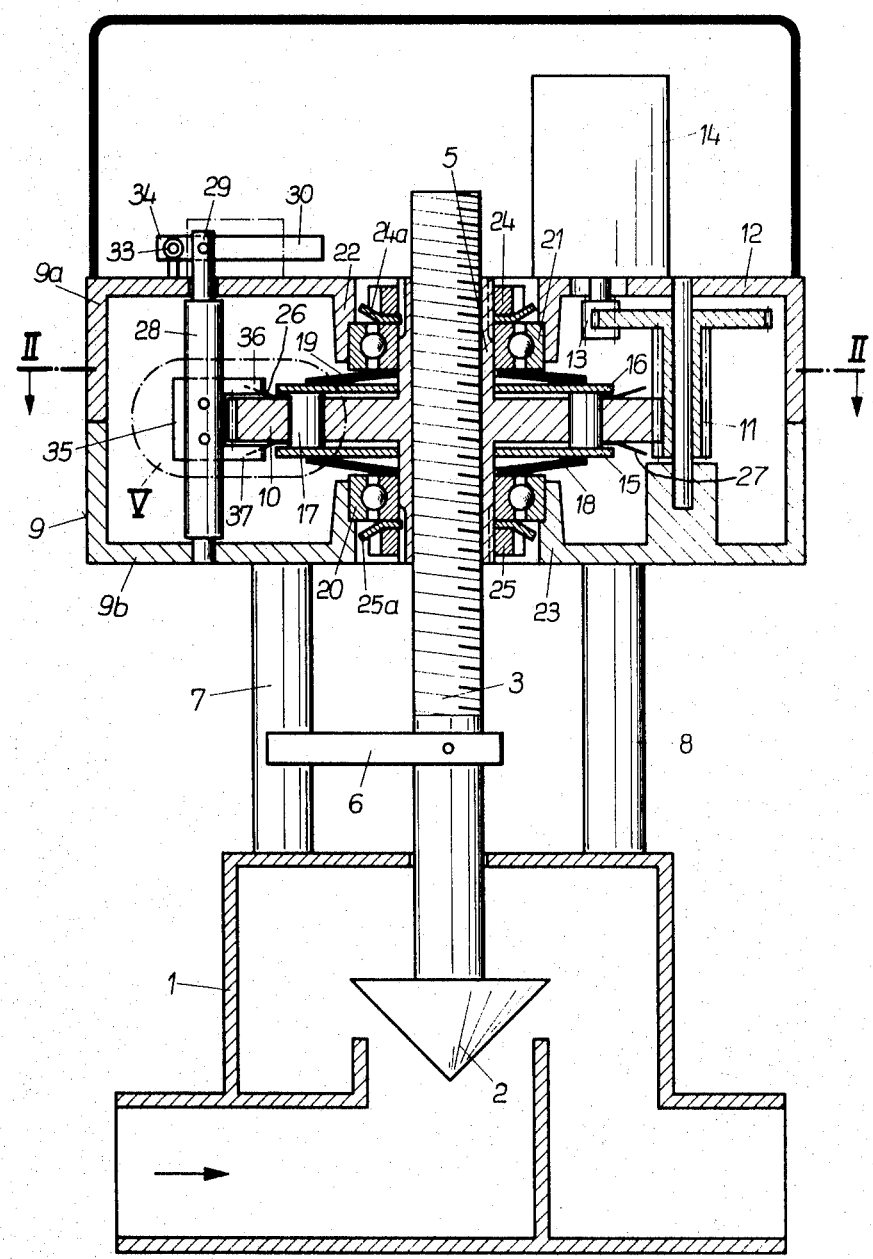
FIG. 1 is a longitudinally axially cross-sectional view.
Figure 2:
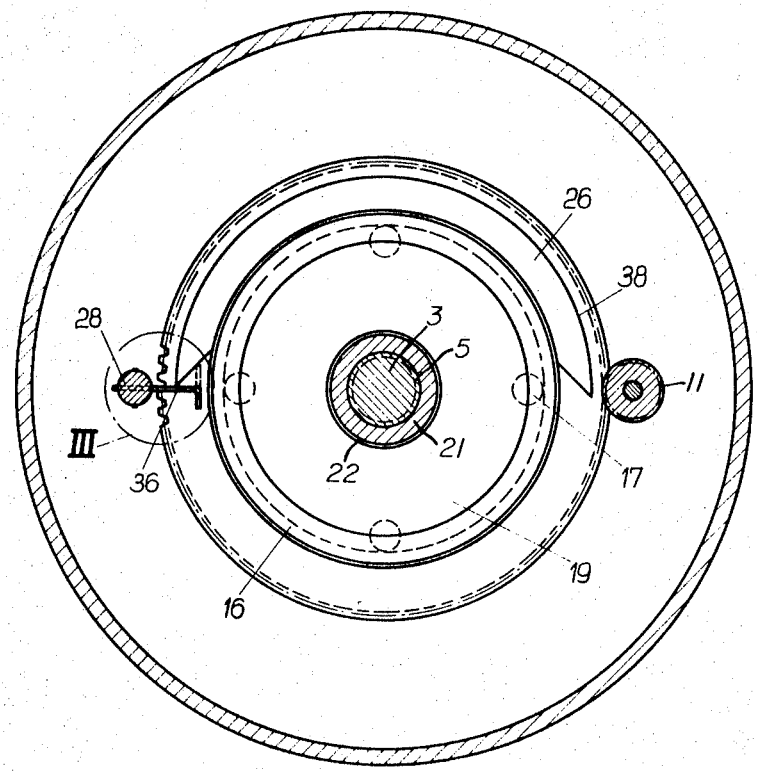
FIG. 2 is a sectional view along lines II—II of FIG. 1.
Figure 4:
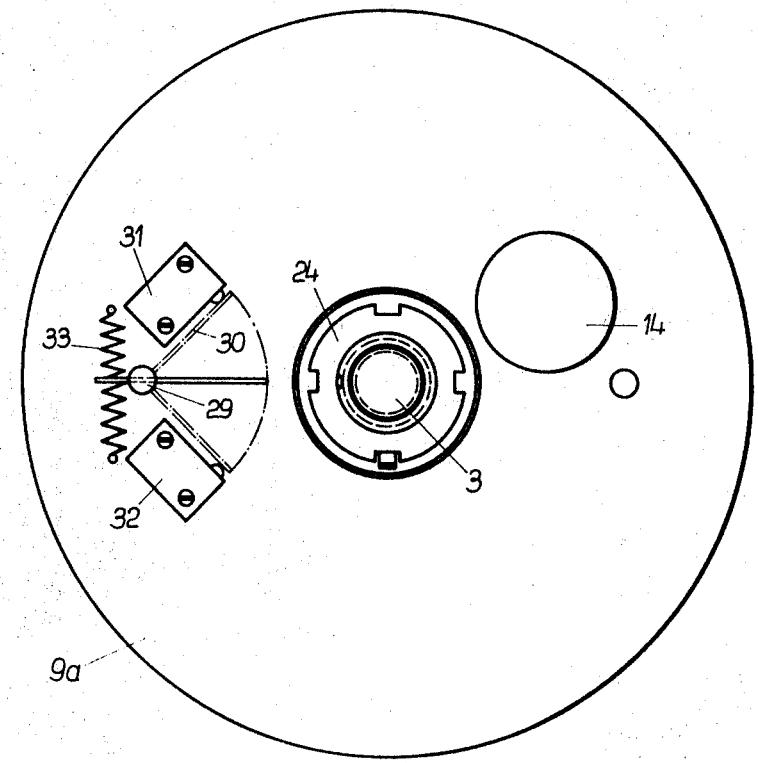
Figure 5:
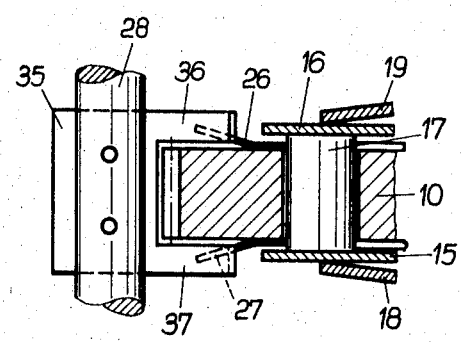
Figure 6:
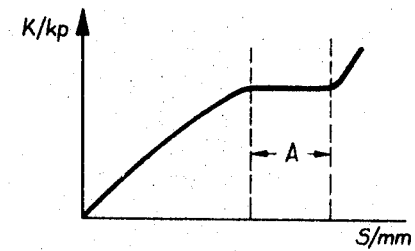

FIG. 3, sub-FIGS. 3a –3f are fragmentary detail views of the operation of the positioning element, the detail being taken essentially within the chain-dotted circle marked III in FIG. 2;

FIG. 4 is a top view of the positioning unit, with the top cover removed;

FIG. 5 is fragmentary view to an enlarged scale, of the subject matter illustrated in FIG. 1 within the chain-dotted oval marked V; and FIG. 6 is a characteristic force (ordinate) vs. deflection distance (abscissa) of a disc spring in the drive in accordance with FIG. 1.

The positioning system will be explained in connection with a drive for an electrically operated valve. Valve body 1 has a valve cone 2, which can be moved against a valve seat, only shown schematically. Valve cone 2 is secured to a valve stem in the form of a spindle 3 which is axially movable by a spindle nut 5. To prevent the spindle 3 from rotating, an arm 6, which may be forked, bears against a support column 7. A similar support column 8 is provided symmetrically to column 7 (with respect to the spindle) to support a housing 9 formed of two superimposed parts 9a, 9b.

Spindle nut 5 has an internally threaded wheel 10 mounted thereon. Wheel 10 is in the form of a gear, meshing with a gear 11, journaled in the housing, which gear 11 is connected to a gear 12, meshing with a gear 13 driven by motor 14. Gear 11 has a substantial axial length (see FIG. 1) so that the nut 5, with gear 10 attached thereto, can have some axially extending excursion without loss of meshing engagement of the gears 10, 11.

A pair of discs 15, 16 are movably secured to the surfaces of gear 10. Discs 15, 16 are maintained at a fixed distance from each other by spacers 17, retained in suitable bores of gear 10. A small axial excursion of gear 10 will cause contact and engagement of one or the other of discs 15, 16, with the surface of gear 10 (see particularly FIG. 5). A pair of disc springs 18, 19, bear against the discs 15, 16. Springs 18, 19, themselves, are maintained in position by ball bearings 20, 21, axially movable and grinded by suitable extending bosses 22, 23 of the halves of the housing 9a, 9b. A pair of nuts 24, 25, secured against rotation by lockwashers 24a, 25a, are provided to preset the bias of the disc springs 18, 19. Nuts 24, 25 turn on spindle nut 5.

A pair of cam discs 26, 27 form the operating elements for the shutoff switch. They are rotatably connected to the surfaces of the gear 10 in such a way that they lie between the discs 15, 16 respectively and the top and bottom faces of gear 10 (FIG. 4). Gear 10, together with nut 5, discs 15 and 16, springs 18,19, spacer 17, and bearings 20. 21, as well as the nuts 24, 25, washers 24a, 25a, and the cam discs 26, 27 form one assembly which is held in the housing 9a, 9b without play, the bearings 20, 21 absorbing axial stresses as well as providing for radial alignment and rotation of gear 10 and nut 5, with respect to the housing 9.

Housing 9 retains a shaft 28 movably adjacent to the gear 10. Shaft 28 extends through the upper housing part 9a, as seen at 29 (FIG. 1); the end 29 is connected to an arm 30 which, upon deflection of shaft 28 engages one, or the other switch 31, 32 (FIG. 4). Shaft 28 is maintained in centered position between switches 31, 32, by a spring 33, connected to an arm 34. Shaft 28 is pivoted sideways by an operating lever formed as a plate 35 which has a U-shaped notch in the side-facing gear 10, to form a pair of arms 36, 37, one reaching above and the other reaching below gear 10 (FIG. 5). The length of the arms 36, 37 is so chosen that they can be engaged by the cam discs 26, 27, respectively, to pivot the switch-operating shaft, or rod 28 so that arm 30 will engage the one or the other of the switches 31, 32. Nuts 24, 25 are so set that the distance between discs 15, 16, and the camming discs 26, 27 is equal on both sides, the entire distance between discs 15, 16, and gear 10 being determined by the length of the spacers 17 The force deflection diagram of a disc spring, as illustrated in FIG. 6, has a substantially horizontal portion in the region denoted A. The distance between a disc 15, or 16, respectively, and the adjacent camming disc 27, 26, respectively, should thus be chosen to be substantially A/2.

Operation: If the power applied to spindle 3 by motor 14 exceeds a certain predetermined force, for example when valve cone 2 seats against the valve seat, so that the bias of the spring discs 18, 19 is overcome, then the spring discs 18, 19, respectively, will compress and nut 5, together with gear 10 will deviate upwardly from the centered position shown in FIGS. 1 and 5. The distance between disc 16, and the adjacent camming disc 26 will decrease, until camming disc 26 will be clamped between gear 10 and disc 16 by a force determined by the axial force being applied to the spindle. Camming disc 26 is thus frictionally coupled to gear 10, so that gear 10 will carry the camming disc 26 along in the direction of rotation of the gear 10. The cam 38 on camming disc 26, which preferably extends over a region of about 180°, will engage the associated lever 36 of plate 35, as best seen if FIG. 2, so that plate 35 and with it operating rod 28 will be pivoted in a direction illustrated in FIG. 3c. Pivoting of shaft 28 carried with it swinging movement of arm 30 so that switch 32 will be operated.

Figure 3A:
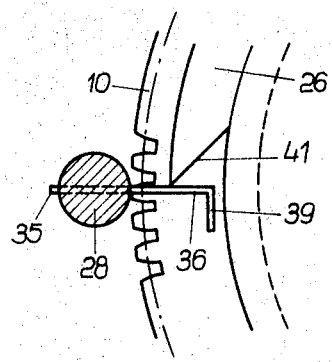
Figure 3D:
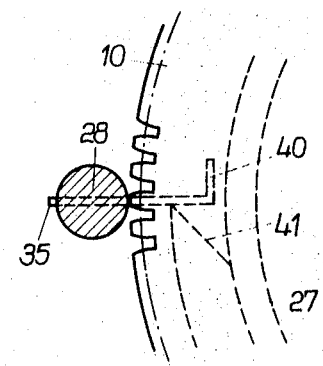
Figure 3B:
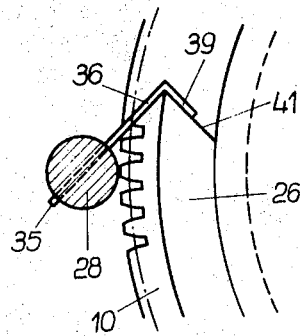
Figure 3E:
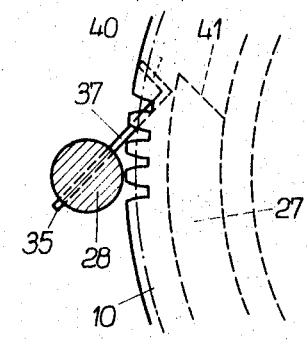
Figure 3C:
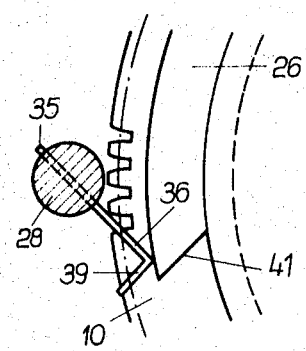
Figure 3F:
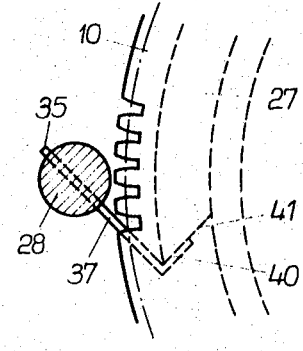

Switch 32 is connected to stop drive motor 14. Deflection of plate 35 from the position shown in FIG. 2 upon rotation of the gear in one direction is shown, in stages, in FIGS. 3a and 3c; FIGS. 3d and 3e show the relationship upon reversed rotation of gear 10, that is engagement of camming disc 27 with arm 37 of plate 35. As seen in FIGS. 3c and 3e, even if the motor should not stop immediately, further movement of the gear, and with it camming discs 26, 27, respectively, will not cause damage to arms 36, 37.

If the force applied to spindle 3 does not exceed the bias on spring discs 18, 19, then camming discs 26, 27 are not coupled to the gear 10. It may occur that grease and the like adhering to the gear will cause the camming discs 26, 27 to be carried along upon motion of the gear itself, so that the force of centering spring 33 may be overcome and shaft 28 can be deflected by engagement of plate 35. It is also possible that the camming disc which is not coupled, that is disc 27 in FIGS. 3a, 3c or disc 26 in FIGS. 3d, 3e can be carried along. It would thus be possible that, upon stopping of the drive, the camming disc which is not coupled to the gear happens to stop in a position in which camming projection 38 (FIG. 2) was moved beneath the respective arm of the deflected plate 35 over a substantial angular distance. If, upon control command, the next motion of the positioning system is in the opposite direction, plate 35, and with it shaft 28 may not be able to return to its centered position since the camming disc is carried along by gear 10, although not coupled thereto. In order to prevent this operation, and to prevent positioning of a camming disc not coupled to the gear beneath one of the arms 36, 37 when deflected, it has been found desirable to form sharp angles 39, 40 on the arms 36, 37 (FIGS. 2, 3), the angles extending in opposite direction, and forming the camming discs 26, 27 with a wedge surface 41, adjacent the cam surface 38. Thus, if plate 35 is carried by disc 26 from the position of Fig. 3a to the position of FIG. 3c, then the uncoupled (lower) camming disc 27 cannot run beneath the deflected arm 37 since its wedge surface 41 will catch on the angled-off part 40. On the other side of the gear, the angled-off part 39 of arm 36 will retain disc 26 by engagement with surface 41, as seen in FIG. 3b, when camming disc 27 has deflected arm 37 as seen in FIG. 3e in reverse direction.

The power-operated positioning system has been illustrated in connection with the positioning of a valve stem; various modifications and changes can be made in a construction of the drive system within the scope of the inventive concept to adapt the positioning arrangement providing for interruption of power when the positioning force exceeds a certain amount, to other uses.

I claim:

1. Power-driven positioning system having power interrupt means upon application of a predetermined positioning force at terminal points of the drive, comprising a spindle (3);

power drive means (11, 12, 13, 14, 15);

a rotatable positioning member (5, 10) rotatable about said spindle and driven in engagement with said power drive means;

spring means (18, 19) maintaining said positioning member in predetermined axial position with respect to said spindle;

rotatably movable operating elements (26, 27) and movable between inactive, and operating positions, normally loosely located on said positioning member for frictional engagement with said positioning member upon excursion of said positioning member from its predetermined axial position and counter the force of said spring means and, upon such frictional engagement, for rotation with said positioning member;

and switch-operating means (35, 28, 29, 30) engaged by at least one of said operating elements upon movement of said operating element from inactive to operating position.

2. System according to claim 1, including friction engagement means (15, 16) interconnecting said positioning member with said operating elements (26, 27) upon excursion of said positioning member from said predetermined axial position, said frictional engagement means (15, 16) coupling said operating elements to said positioning member to move the operating elements together with movement of the positioning member transmitted from said power drive means.

3. System according to claim 1, wherein the operating elements (26, 27) includes at least one cam disc, coaxial with the rotatable positioning member (5, 10);

and said switch-operating means includes at least one lever (36, 37) located to be in the path of said cam disc upon rotation of said cam disc from inactive to operated position, engagement of said lever by said cam disc causing operation of said switch means.

4. System according to claim 3, including a switch-operating rod (28) located adjacent the circumference of said positioning member, said lever extending towards said positioning member for engagement by said cam disc;

a housing (9; 9a, 9b) enclosing said positioning member, cam disc and lever;

and resilient means (33) maintaining said rod, and hence said lever in centered, inactive position.

5. System according to claim 1, wherein the rotatable positioning member is a gear wheel (10) connected to a drive nut, and in threaded engagement with said spindle (3);

a pair of discs, one each located adjacent a face of said gear and rotatable therewith and spacer means holding said discs spaced from each other, said spacer means being slightly longer than the thickness of said gear to permit axial movement of said discs with respect to said gear, and engagement of a disc with a face of said gear;

said spring means (18, 19) being spring discs located to bear against said discs at the side of said discs opposite to that adjacent the gear;

and said operating elements are camming discs located between said discs and the face of said gear, and freely rotatable with respect to said gear when said discs are spaced from said gear, said camming discs being clamped between said discs and said gear by spring pressure of said disc springs upon relative axial excursion of said gear, and said discs due to reactive force of the spindle, counter the force of said springs, when the spindle has reached a terminal position, so that said camming discs will be frictionally engaged by said gear and carried therealong.

6. System according to claim 1, including a housing (9a, 9b) enclosing said positioning system;

axially movable ball bearings located in said housing and securing said rotatable positioning member (5, 10) in position in said housing;

and means determining the position of said ball bearings in said housing so that the ball bearings will absorb thrust and provide for rotatably journaling said positioning member.

7. System according to claim 6, wherein said spring means comprises a pair of bowed springs; said positioning member comprises a gear, said bowed springs being located at opposite faces of said gear;

and means are provided to adjust the bias of spring pressure exerted by said bowed springs towards the faces of said gear.

8. System according to claim 1, wherein said positioning member comprises a gear rotatable about said spindle;

said operating members comprise camming discs located adjacent to and at opposite faces of said gear; the camming discs having a projecting cam rise extending over approximately 180°.

9 System according to claim 3, wherein said positioning member includes a gear rotatable about said spindle;

and a pair of camming discs are provided, coaxial with said gear, one each located adjacent an opposite side of said gear, each camming disc having an inclined holding surface (41);

and said levers in the path of said camming discs are formed with angled-off projections (39, 40) engageable by said inclined surface of said camming discs.

10. System according to claim 9, wherein a pair of levers are provided, the angled-off portions of said levers being angled in oppositely extending directions.

11. Power-driven positioning system having force-controlled shutoff switch means comprising a rotatable gear (10);

bowed spring means (18, 19) located adjacent opposite faces of said gear, said gear being centered with respect to said spring means;

camming means (26, 27) rotatable with said gear and interposed between said spring means and at least one face of said gear;

and switch-operating means located to be engaged by said camming means upon rotation of said camming means by frictional coupling to said gear upon excursion of said gear from said centered position when the axial reactive forces upon shutoff exceed the centering forces of said spring means.

12. System according to claim 11, wherein said spring means are disc springs.

13. System according to claim 12, including a pair of discs interposed between said spring means and said camming means;

and spacers of a length slightly greater than the thickness of the gear and the camming means and holding said discs out of engagement with the interposed camming means when said gear is in centered position.

14. System according to claim 11, wherein said camming means are a pair of camming discs, one located adjacent each face of said gear; and said switch-operating means comprises a swingable lever arm located to be engaged by said camming discs when rotated by frictional engagement with said gear.

* * * * *